(12) United States Patent
Johnson

(10) Patent No.: US 6,918,030 B2
(45) Date of Patent: Jul. 12, 2005

(54) MICROPROCESSOR FOR EXECUTING SPECULATIVE LOAD INSTRUCTIONS WITH RETRY OF SPECULATIVE LOAD INSTRUCTION WITHOUT CALLING ANY RECOVERY PROCEDURES

(75) Inventor: Andrew Johnson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 10/045,110

(22) Filed: Jan. 10, 2002

(65) Prior Publication Data

US 2003/0135722 A1 Jul. 17, 2003

(51) Int. Cl.[7] ............................................. G06F 15/00
(52) U.S. Cl. ..................................... 712/225; 712/219
(58) Field of Search ............................. 712/235, 218, 712/219, 207, 244, 225

(56) References Cited

U.S. PATENT DOCUMENTS

| 5,634,023 A | * | 5/1997 | Adler et al. ................. 712/244 |
| 5,802,337 A | * | 9/1998 | Fielden ........................ 712/216 |
| 5,987,594 A | * | 11/1999 | Panwar et al. ............... 712/216 |
| 6,189,088 B1 | * | 2/2001 | Gschwind .................... 712/216 |
| 6,598,156 B1 | * | 7/2003 | Arora .......................... 712/244 |
| 6,606,702 B1 | * | 8/2003 | Guthrie et al. .............. 712/218 |
| 6,618,803 B1 | * | 9/2003 | Hannum et al. ............. 712/225 |
| 6,658,559 B1 | * | 12/2003 | Arora et al. ................. 712/245 |
| 6,681,317 B1 | * | 1/2004 | Mathews ..................... 712/203 |
| 2001/0056530 A1 | * | 12/2001 | Harris ......................... 712/220 |
| 2003/0105942 A1 | * | 6/2003 | Damron et al. ............. 712/216 |

* cited by examiner

*Primary Examiner*—Eddie Chan
*Assistant Examiner*—Brett Buehl
(74) *Attorney, Agent, or Firm*—Mark E. McBurney

(57) ABSTRACT

A system, method and apparatus is provided that splits a microprocessor load instruction into two (2) parts, a speculative load instruction and a check speculative load instruction. The speculative load instruction can be moved ahead in the instruction stream by the compiler as soon as the address and result registers are available. This is true even when the data to be loaded is not actually required. This speculative load instruction will not cause a fault in the memory if the access is invalid, i.e. the load misses and a token bit is set. The check speculative load instruction will cause the speculative load instruction to be retried in the event the token bit was set equal to one. In this manner, the latency associated with branching to an interrupt routine will be eliminated a significant amount of the time. It is very possible that the reasons for invalidating the speculative load operation are no longer present (e.g. page in memory is not present) and the load will be allowed to complete. Therefore, substantial gains in efficiency and resource utilization can be achieved by deferring the branch to recovery routines until after the speculative load is retried.

19 Claims, 4 Drawing Sheets

MICROPROCESSOR FOR EXECUTING SPECULATIVE LOAD INSTRUCTIONS WITH RETRY OF SPECULATIVE LOAD INSTRUCTION WITHOUT CALLING ANY RECOVERY PROCEDURES

BACKGROUND OF THE INVENTION

1. Field of the Invention

The present invention relates to the execution of program instructions by a microprocessor unit, particularly speculative load instructions. More specifically, the present invention includes a technique to allow the result of a speculative load to be checked, and to use the result of the speculative load if that was successful or to reissue the load if the speculation was unsuccessful.

2. Description of Related Art

With the continual advance of computer technology, more and more circuitry is being provided on each integrated circuit (IC) while microprocessor speeds are constantly increasing. However, memory speeds have not been increasing at the same rate as the microprocessor clock speeds. This disparity can cause a latency to occur when certain instructions are used to access memory locations. One example is a load instruction which basically accesses data stored in system memory and loads it into the microprocessor's data cache.

In modern computers, loading data as early as possible is one technique for speeding up systems. When an instruction requires certain data, if the data is not in the cache, then execution of the instruction must wait while the data is retrieved from main memory. This delay is known as memory latency. As noted above, processor speeds that are substantially higher than memory speeds will cause latency. One method of reducing this latency is to issue load instructions as early as possible, preferably so early that even when it is necessary to wait for retrieval from memory, the latency is greatly reduced. That is, the load instructions are issued early enough, that even taking memory latency into account, the results of the instructions will be available at substantially the same time they would have been had the instructions had been executed in the original program order with no load latency.

Of course, problems can arise when data is loaded too early. In some cases the registers holding the data may need to be used for a different computation before the instruction that needed the data is ready. Also, data could be loaded before it is even known that a memory access to fetch the data would be undertaken. Additionally, the contents of a certain memory location can be loaded before the actual required data is computed and placed in that memory address.

Further, it can be seen that a problem arises when speculative loads are executed too early in the pipeline. That is, the data may be invalid because it is not yet read (e.g. has yet to be computed from an arithmetic operation, or the like). Also, when the load is determined to be invalid (NaT=1) a typical system will be forced to call a recovery routine and recompute the instructions leading up to the required load instruction, which can be an inefficient use of time and resources.

In typical computer systems, these limitations severely impede the ability to do loads early enough to get significant increases in speed. The INTEL IA-64 architecture uses an instruction called a speculative load (ld.s) that is executed by the processor early in the instruction stream. Each general purpose register has an associated bit known as the Not a Thing (NaT) bit (NaTVal for floating point registers) that keeps track of whether or not the data is valid. Later in the instruction stream, when the load is known to be necessary, a speculation check instruction (chk.s) is executed which checks the NaT bit to confirm that the data is still valid (NaT=0). However, if invalid data is detected (NaT=1) recovery operations are commenced. The NaT bit is set when the load fails (e.g. incomplete or incorrect data). This bit is propagated with the load instructions through the pipeline. Typically, when the processor is ready to use the loaded data it checks the NaT bit and if it is set (equals logical 1), then recovery code is called and the data value must be recomputed. That is, the speculative check instruction (chk.s) tests for a deferred exception token (NaT=1). If none is found, then the speculative calculation was successful, and execution continues normally. However, if the NaT bit is set then the speculative calculation was unsuccessful and must be redone. In this ease, the chk.s instruction branches to a new address to invoke recovery code (program that contains a copy of the speculative calculation with non-speculative lands). In this manner, it can be seen that the existing chk.s instruction in the IA-64 instruction set will always cause the branch to recovery to be taken when the deferred exception token is found (NaT=1).

An example of a sequence of IA-64 instructions that may cause the branch to recovery are set forth below. The speculative load instruction e.g. ld8.s r21=[r20] will set the NaT bit in register r21 if the load could not be done without causing an exception. The NaT bit can be checked using chk.s and after a branch to the recovery routine the load can be retried and control returned to the point where it would have been after the load instruction. The code below is provided as an example of this additional embodiment.

```
(1) ld8      r20 = [r19]         // get pointer
;;
(2) ld8.s    r21 = [r20]         // speculatively read value which pointer
                                 points to
(3) cmp.eq   p6, p0 = 0, r20     // was pointer null?
(4) (p6) br.cond NullPointer     // yes it was
;;
(5) chk.s    r21, recover
(6) continue:
```

Another example of an IA-64 code sequence that can cause a branch to recovery is provided below.

```
(1) ld8      r20 = [r19]         // get pointer
(2) ld8.s    r21 = [r20]         // speculatively read value referenced by
                                 // pointer
(3) cmp.eq   p6, p0 = 0, r20     // compare, was pointer null?
(4) (p6) br.cond NullPointer     // yes, pointer is null
(5) chk.s    r21, recover        // recover (check NaT bit for register 21, if
                                 // NaT = 1, call recovery routine)
(6) continue:                    // recovery complete, continue with program
(7) recover:                     // recovery code
(8) ld8      r21 = [r20]         // load value referenced by register r20
(9) br.cond continue             // branch to next basic block of instructions
```

It can be seen in both cases, shown immediately above, that when the instructions check the status of the NaT bit, and it is set equal to one, then a branch to a recovery routine is implemented. This speculation check branch to the recovery routine is very slow and can use greater than fifty (50)

cycles, due to the need to branch to recovery code (and return to the basic bundles of the instruction sequence), which makes this operation time consuming and inefficient. One reason for the inefficiency includes the fact that labels can only be utilized on an instruction bundle boundary (in the IA-64 architecture, instructions are organized in bundles of three (3) instructions). Inserting labels for the return from the branch to recovery routine may mean inserting nop (no-operation) op codes in the instruction bundle before the label, which can cause these high cycle time penalties.

Another problem occurs when data is loaded from a specific location in memory, possibly before the computation has occurred to place the correct data in that memory location. This situation can happen when the processor executes an advanced load (ld.a) instruction early in the instruction stream. An entry in a special register called the advanced load address table (ALAT) marks the occurrence of an advanced load. As with all registers, the ALAT is of a limited size and can only accommodate a relatively small number of entries. If the load is later shown to be required, a check load (ld.c) instruction, executed after any possibly conflicting stores, checks the entry in the ALAT to confirm that the data is still valid and original data at the specific location in memory has not been changed by a conflicting store.

Those skilled in the art will appreciate the significant restriction imposed by the ALAT. That is, any such table will have a finite size and limit the number of speculative load checks that can be implemented. This allows checking of only those loads stored in the ALAT, which can limit performance, since once a load is moved out of the table, it takes a great deal of resource to restore that load in the ALAT (i.e. obtain data from memory and place the data in the ALAT).

Therefore, it can be seen that a need exists for a mechanism to allow speculative loads to be executed as early as possible, without using valuable processing time and resources (i.e. branching to a recovery routine to recompute the load when the NaT is set) which is required if the load is found to be invalid.

Further, there is a need for a system that will provide the ability to check the validity of a speculative load instruction itself without the restriction necessitated by use of a limited size load table.

SUMMARY OF THE INVENTION

In contrast to the prior art, the present invention is a mechanism that allows the load to be retried when the result of a speculative load is checked and found to have the NaT bit set. At the retry point any errors that could have caused the original speculation to be invalid may have been removed, e.g. page in memory is not present, or will be handled transparently by the operating system (e.g. a page still not present will cause a fault, which will be handled and bring in the page, then the instruction will resume execution).

More particularly, the present invention splits the load instruction into two (2) parts, a speculative load instruction and a check speculative load instruction. The speculative load instruction can be moved ahead in the instruction stream by the compiler as soon as the address and result registers are available. This is true even when the data to be loaded is not actually required. This speculative load instruction will not cause a fault in the memory if the access is invalid, i.e. the load misses and causes the NaT bit to be set.

The check speculative load instruction of the present invention will cause the speculative load instruction to be retried as a normal load based on the state of certain status information, such as in the event the NaT bit was set equal to one. In this manner, the latency associated with calling an interrupt routine will be eliminated a significant amount of the time, since it is very possible that the reasons for invalidating the speculative load operation are no longer present and the load will be allowed to complete. The time consuming branch to the recovery routine is also avoided as recovery occurs in situ. Therefore, substantial gains in efficiency and resource utilization can be achieved by deferring the call to recovery routines until after the speculative load is retried.

In accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

In modern computers, loading data as early as possible is very useful for increasing the speed of the systems. If the data is not in the cache when loaded by the program, execution must wait while the data is retrieved from memory. This delay is known as memory latency and leads to a desire to execute load instructions as early as possible, preferably so early that even waiting for memory is not a problem. Realistically, the compiler can try to eliminate at least some of the memory latency delays by moving loads earlier in the instruction stream. The IA-64 architecture includes a speculative load instruction (ld.s) to obtain data earlier rather than later and it uses the NaT bit to ensure that the early retrieved data is still valid when used. A speculation check (chk.s) instruction checks the NaT bit to confirm the validity of the prefetched data, but causes a branch to recovery routines when the data is invalid. Another aspect of the IA-64 architecture allows an advanced load (ld.a) instruction to be executed early in the instruction stream. This places an entry in the advanced load address table (ALAT), which marks the occurrence of the advanced load. Subsequently, when it is determined that the load is necessary, a check load (ld.c) instruction must check for the entry in the ALAT to confirm that the data is valid and to initiate recovery if it is not.

It can be seen that a distinction exists in the IA-64 architecture between an advanced load instruction, which is constrained by the ALAT, and a speculative load instruction, that has no such constraint. Thus, a preferred embodiment of the present invention enhances microprocessor performance by eliminating the costly branch to recovery of the conventional speculation check (chk.s) instruction, and decoupling the dependency on the ALAT as required by the check load (ld.c) instruction.

Figure 4:
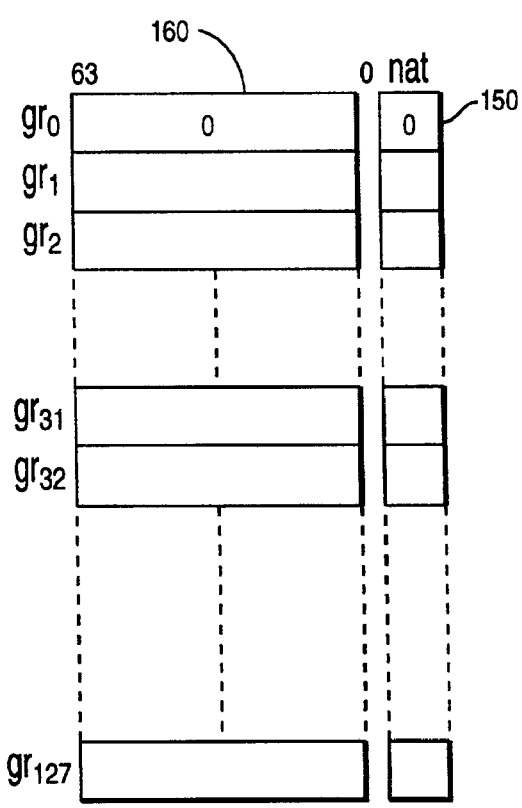
FIG. 4 shows the general purpose register file of a representative microprocessor including the NotAThing bit field associated with each register.

The NaT bit is essentially a deferred exception token that propagates through the program in a dataflow manner. A speculative instruction that reads a register containing a deferred exception token will propagate the deferred exception token into its target. That is, if one of the general registers (0–127), as shown in FIG. 4, has an associated NaT bit that is set, then the NaT bit will be propagated with the information from the general register to the destination. At the point in the program when it is known that the result of a speculative calculation is needed a speculation check (chk.s) instruction is used. This instruction tests for a deferred exception token (determines if the NaT bit is set). If the state of this status information is such that the bit is not set, then the speculative calculation was successful, and execution continues normally (i.e. speculative loading continues). However, if this status information state is bit is set (NaT=1), then the speculative calculation was unsuccessful and the operation must be redone, by calling recovery code. In this case, the chk.s instruction branches to a new address (specified by an immediate offset in the chk.s instruction). Software can use this mechanism to invoke code that contains a copy of the speculative calculation (but with non-speculative loads). Since it is now known that the calculation is required, any exceptions which now occur can be signaled and handled normally.

Figure 1:
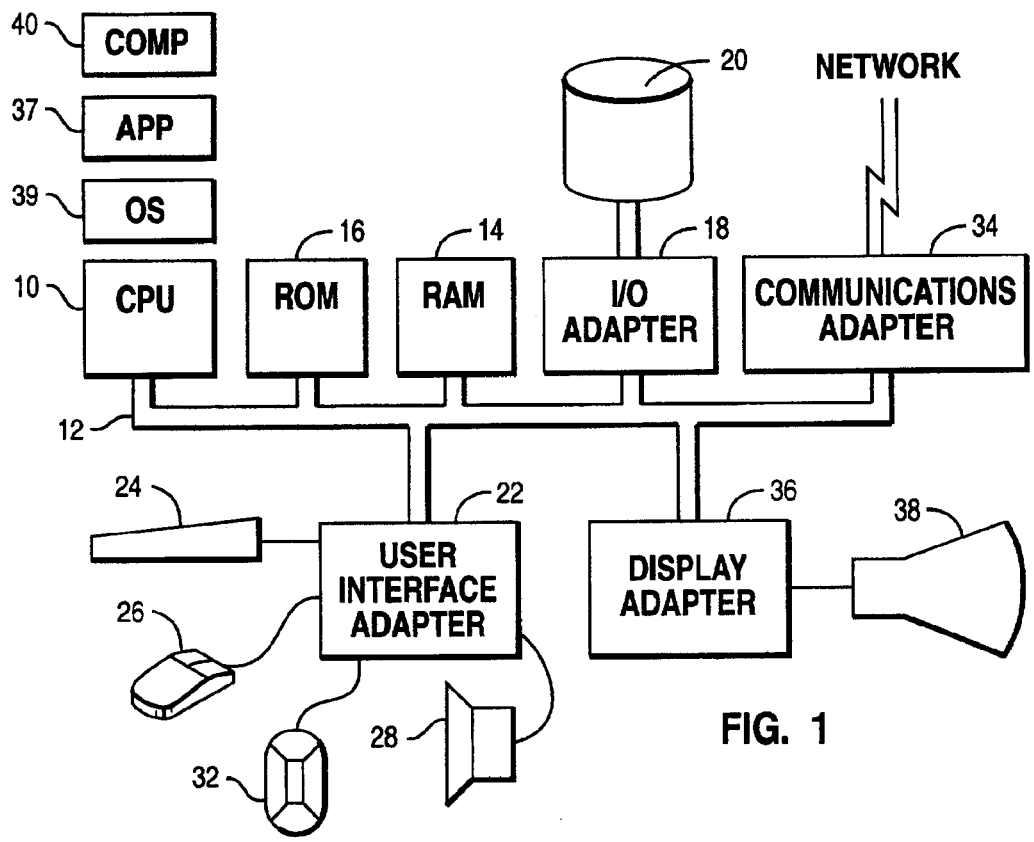
FIG. 1 is a block diagram of an overall computer system that may include a microprocessor capable of implementing the speculative load checking of the present invention.

Referring to FIG. 1, a typical data processing system is shown which may be used in conjunction with the present invention. A central processing unit (CPU) 10 may include an INTEL Itanium microprocessor that executes the IA-64 instruction set and is commercially available from Intel Corporation, as well as any other commercially available microprocessor that performs speculative processing and would benefit from the ability to check such speculative operation, such as the POWER 3 microprocessor from International Business Machines, Corp. The CPU 10 is shown interconnected to the various other system components by a system bus 12. Read only memory (ROM) 16 is connected to CPU 10 via bus 12 and includes the basic input/output system (BIOS) that controls the basic computer functions. Random access memory (RAM) 14, input/output (I/O) adapter 18 and communication adapter 34 are also connected to system bus 12. I/O adapter 18 may include a small computer system interface (SCSI) adapter that communicates with a disk storage device 20. Communications adapter 34 may be a network card that interconnects bus 12 with an outside network. Adapter 34 may also include an I/O port that allows a connection to be made, through a modem 40, or the like to enable the data processing system to communicate with other such systems via the Internet, or other communications network (LAN, WAN). User input/output (I/O) devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. In this mariner, a user is capable of inputting to the system through keyboard 24, trackball 32 or mouse 26 and receiving output from the system via speaker 28 and display 38. Additionally, an application program 37 is running on operating system (OS) 39, such as the AIX, DOS, OS/2, WINDOWS operating system, or the like. Operating system 39 is shown running on CPU 10 and used to coordinate the functions of the various components illustrated by FIG. 1. Program 37 is used to provide specific functions desired by the user, such as word processing, spread sheet, calendar, or the like. Those skilled in the are will understand that program 37 and OS 39 are running on CPU 10 in a binary format, as output by a compiler 40, which transforms the source code from a programmer into a form which is executable by a microprocessor.

Figure 2:
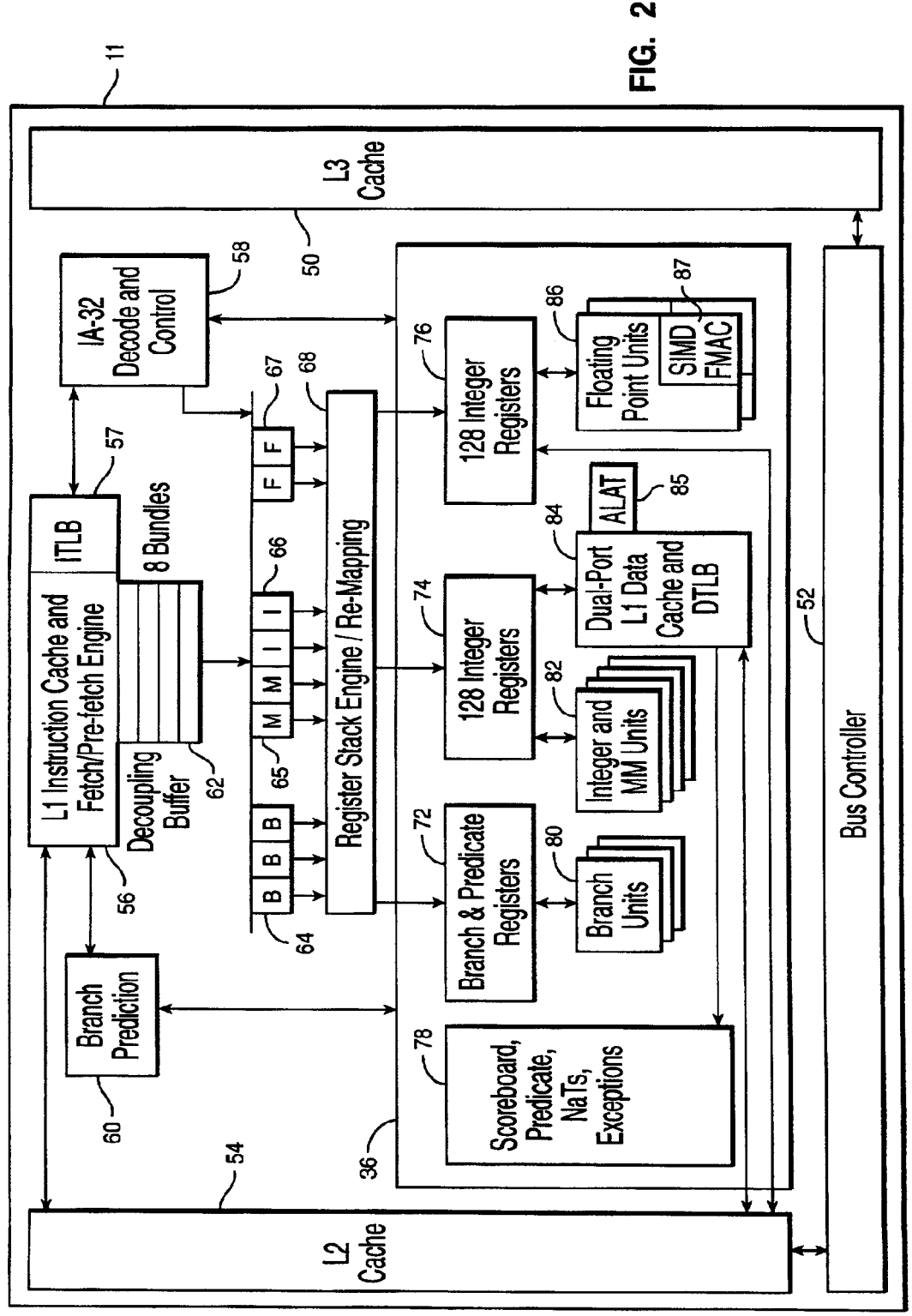
FIG. 2 is another block diagram of the functional units included in the microprocessor of FIG. 1 that is capable of executing specific instructions in accordance with the present invention.

Referring to FIG. 2, a block diagram of a microprocessor 11 that is capable of implementing the novel speculative load instruction checking scheme of the present invention is shown. The term microprocessor or processor, as used herein will refer to the basic instruction processing and execution unit(s) and can be considered a subset of a CPU which may include additional data processing functions, e.g. I/O operations.

The following description is a high level summary of the operation of an ITANIUM microprocessor, which is used herein as merely one example of a type of processor capable of benefiting from the present invention. Of course, any data processing system which may use the speculative check function of the present invention is contemplated by the scope of the appended claims. For additional information regarding the ITANIUM microprocessor, please refer to the *Intel Itanium Architecture Software Developer's Manual*, vols 1–4, July 2000; *Itanium Processor Microarchitecture Reference*, August 2000, and the *Intel Itanium Processor Hardware Developer's Manual*, May 2001, all available from the Intel Corporation.

Microprocessor 11 is capable of executing the IA-64 instruction set from Intel and includes an on-board L3 (level 3) cache 50 which is coupled by bus controller 52 to L2 (level 2) cache 54. L1 (level 1) instruction cache (I-cache) controller 56 and L1 data cache (D-cache) controller 84 are coupled to L2 cache 54. I-cache controller 56 includes the instruction cache, as well as the fetching/pre fetching logic, decode logic, and the like. Instruction translation lookaside buffer (ITLB) 57 and a data translation lookaside buffer (DTLB included in D-cache controller 84) are used in the virtual address to physical address translation process. Caches 50, 54, 56 and 84, along with system memory (not shown), constitute the hierarchical memory subsystem that is included in most modern microprocessors. Caches, 50, 54 and 56 are typically higher speed, yet smaller capacity storage devices than system memory. Processor efficiency can be increased if the required data and/or instructions are present in one of the caches, i.e. the latency required to get the data or instructions from a cache is much less than if the information were required to be retrieved from memory. Those skilled in the art will understand that there are many different types of cache replacement algorithms (e.g. least recently used—LRU), which may be used in accordance with the present invention.

Decode and control unit 58 enables an IA-64 microprocessor to execute IA-32 (32 bit) instructions in order to make it backwards compatible with existing programs. The instructions are decoded by unit 58 to determine what type of instruction is being executed, i.e. whether they are integer, floating point, branch, or the like. Branch prediction unit 60 provides information to the branch units regarding the likelihood of a branch being taken, or not. That is, when branch instructions are encountered a branch calculation is evaluated and either a branch is taken or execution continues with the next sequential instruction. Branch decisions are made based on values stored in the predicate registers which hold the results of compare instructions. If the condition is met (as shown by the appropriate bit(s) being set in the predicate register) then the branch is taken. Branch prediction is typically a history of the execution of previous branch instructions and their outcome. A branch history table is used to keep track of the outcome of the prior branch instructions (take or not taken) and a prediction is communicated to the branch processing unit 80, based on this history. Additionally, branch hints can be provided by the compiler, based on recurring sequences of instructions.

The IA-64 instructions from I-cache 56 are placed in an eight (8) place decoupling buffer 62 which feeds bundles of instructions to nine (9) issue ports 64, 65, 66 and 67. Issue port 64 receives bundles of branch instructions, port 65 receives memory instructions, port 66 receives integer instructions and issue port 67 receives bundles of floating point instructions. Register stack engine 68 controls the various register files to eliminate overhead associated with calls and returns. That is, when a procedure is called a new frame of registers is made available to the called procedure without the need for an explicit save of the called procedure's registers. Those skilled in the art will recognize this function as a form of register renaming which is common in most modern microprocessors. The old registers remain in the large physical register file as long as there is enough physical capacity. When the number of registers needed overflows the available physical capacity, register stack engine 68 will call a state machine to save the registers to memory to free up the necessary physical registers needed for the upcoming procedure call. The process is reversed on a call return wherein the state prior to the call is restored by placing the data previously stored to memory back in the physical register file.

There are normally several register sets included in a microprocessor. These will include the integer registers 74 and floating point registers 76, which each include 128 registers for this IA-64 processor. Predicate and branch registers are shown in FIG. 2 by reference numeral 72. The predicate registers are partitioned into two subsets. Reference numeral 72 shows the static predicate registers which hold the results of compare instructions and are used for conditional execution of instructions, such as branch instructions. Branch registers are used to hold branching information, such as the branch target address. The NaT register, exception register, register scoreboard, and predicate register are shown by reference numeral 78 and are used to control execution of the instructions. The NaT bits have been described previously. The subset of predicate registers (rotating predicate registers) referred to by reference numeral 78 are capable of being programmably renamed to accelerate loops. Register scoreboarding is used during the operand delivery stages of the processor pipeline to assist in moving the appropriate information from the registers into the execution units. Exception registers track which instructions may have caused a fault, or error to occur and whether that error will require re-execution of an instruction sequence.

An additional component of D-cache 84 is advanced load address table (ALAT) 85. This structure is used to enable data speculation in an IA-64 processor. The ALAT keeps information on advanced data loads issued by the processor and any stores that are associated with these loads. In one embodiment the ALAT may include 32 entries and be two way set associative. The IA-64 architecture includes an advance load (ld.a) instruction which is executed earlier in the instruction stream than a normal load. An entry is made in the ALAT which marks the occurrence of an advanced load. When the load is proven necessary, a check load instruction (ld.c) checks the entry in the ALAT to confirm that the data is valid and to initiate a recovery if it is not.

Branch units 80 are used to execute all branch instructions and use information from branch prediction unit 60 and branch registers 72 when processing these instructions. Integer and memory units 82 execute, for example, fixed point arithmetic and load/store type instructions. Floating point units 86 execute floating point instructions including standard single and double precision floating point instructions. A SIMD portion 87 is provided which provides the additional capability of executing single-instruction-multiple-data (SIMD) instructions.

Figure 3:
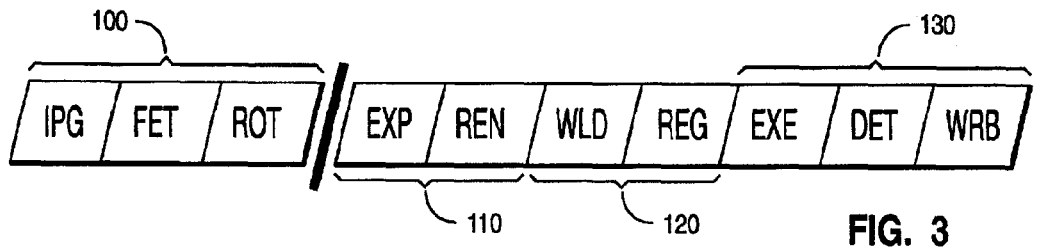
FIG. 3 represents the pipeline stages of the microprocessor of FIG. 2 which describe the steps implemented to execute the microprocessor instructions.

Referring to FIG. 3, the instruction processing pipeline for the exemplary IA-64 microprocessor of a preferred embodiment of the present invention is shown and will now be described. It can be seen that the pipeline is ten (10) stages and includes front-end stages 100 and back-end stages 110, 120, 130. Front-end 100 includes the instruction pointer generator stage (IPG), fetch stage (FET) and rotate stage (ROT). These stages fetch/pre-fetch instructions, retrieve branch prediction information and place the fetched instructions in the decoupling buffer. Section 110 of the pipeline delivers the instructions by dispersing them from the decoupling buffer to the issue ports (EXP), and remapping registers (REN) for use by the instructions to be processed. The operand delivery section 120 of the pipeline implements word line decode (WLD) and register read (REG) bypasses, scoreboarding and predicated dependencies to provide data for processing by the instructions. Section 130 is the execution section of the pipeline and executes (EXE) the instructions on one of the units (e.g. integer, floating point, branch) and then detects (DET) whether the execution caused and exception to occur. Finally the write-back (WRB) stage returns the results of the instruction execution to the register file for use by subsequent instructions.

FIG. 4, shows the relationship of the NaT registers 150 to the general registers 160. It can be seen that each of the 128 registers of general register file 160 has a corresponding single bit NaT register for storing a status indicator which is used as a token which propagates with the data in the associated register to assist in speculative execution of instructions by.

Figure 5:
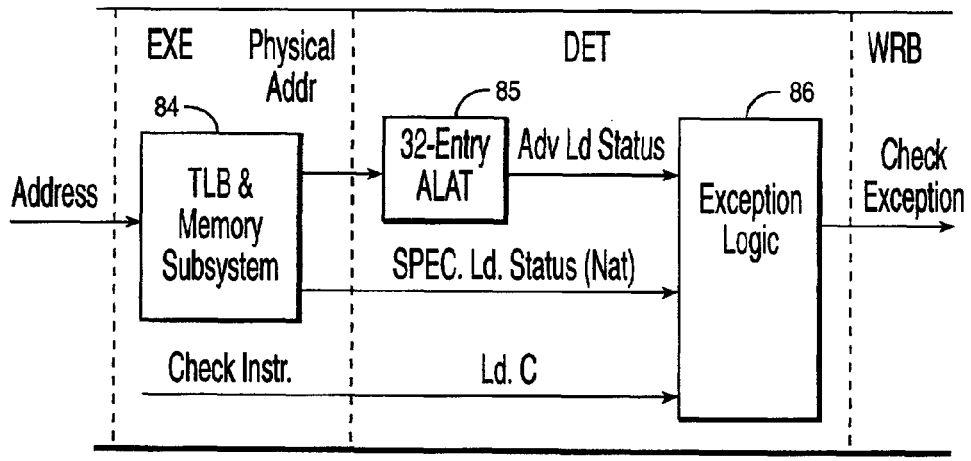
FIG. 5 is a block diagram showing the operation of the advanced load address table in accordance with a conventional system.

Referring to FIG. 5, the speculative advanced load hardware for the IA-64 ITANIUM processor is shown. The virtual address for the operand data corresponding to an advanced load instruction is input to translation lookaside buffer (TLB) 84, where the virtual address is translated to a physical address and entered into ALAT 85. As described previously, the NaT bit propagates with the advanced load and the speculative load status instruction to exception logic 86 which determines if the data from the advance load is valid. The speculation check instruction (chk.s) then calls a recovery routine if the NaT bit is set, indicating the data is invalid.

Figure 6:
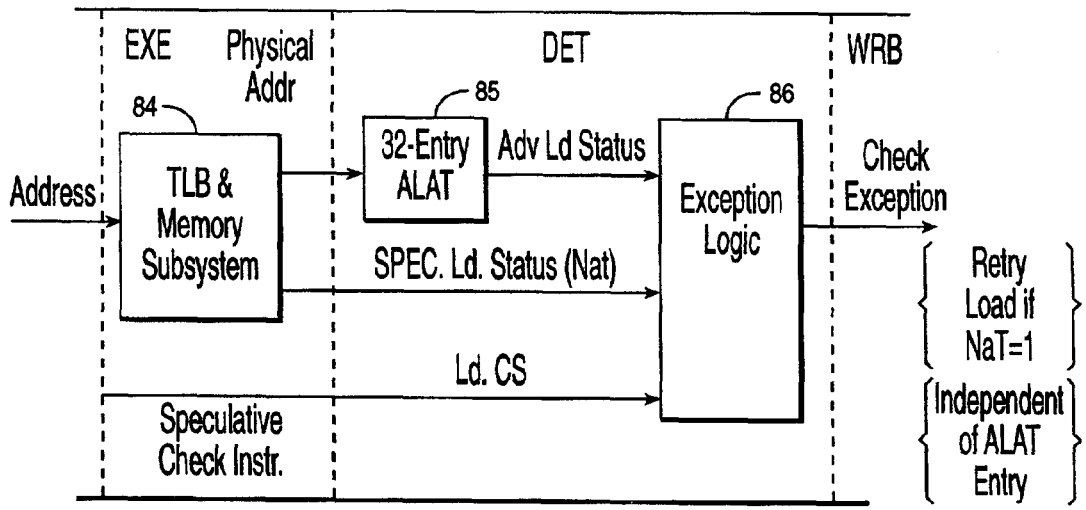
FIG. 6 is another block diagram of the speculative load hardware associated with the present invention.

FIG. 6 shows one preferred embodiment of the present invention wherein a new microprocessor instruction is added to the IA-64 instruction set. This instruction is a check speculative load instruction (ld.cs). This instruction checks whether the NaT bit for the speculative load instruction is set. If not, then processing continues normally. However, if NaT=1 then the speculative load is retried as an ordinary load. This will let the circumstances that may have caused the speculative load operation to fail to be removed such that the load can then be processed in a shorter period of time than would be taken if the recovery routines and re-issuance of instructions occurred, as in conventional systems. If the load still fails due to a recoverable circumstance, such as a page not present, then the resulting exception is handled as with a normal load by the operating system, which brings the page into memory, then resumes program execution at the load instruction, which can now succeed. Further, the previously described speculation check branch instruction to call the recovery routine is not needed. Thus, valuable processor resources are used more efficiently. Those skilled in the art will understand how an additional microprocessor instruction can be added by modifying the logic to recognize the op code of the new instruction and perform various functions based upon the bit pattern of the instruction.

An example of the instructions, including the newly added check speculative load instruction, that could be executed to achieve one advantage of a preferred embodiment of the present invention are set out below.

```
(1) ld8     r20 = [r19]        // get pointer
(2) ld8.s   r21 = [r20]        // speculatively read value which pointer
                                  points to
(3) cmp.eq p6,p0 = 0, r20      // was pointer null?
(4) (p6) br.cond NullPointer   // yes, pointer is null
(5) ld8.cs r21 = [r20]         // proceed using speculatively loaded value
                                  of r21,
                               // retry load if NaT bit for r21 is set.
```

The check speculative load (ld8.cs) instruction would be added to the IA-64 architecture. This instruction would retry the load if the NaT bit was set on r21, otherwise it would allow the current value of r21 to be used with zero latency in the current instruction group. If the load were retried then it would be handled as an ordinary load and any faults would be handled normally.

Figure 7:
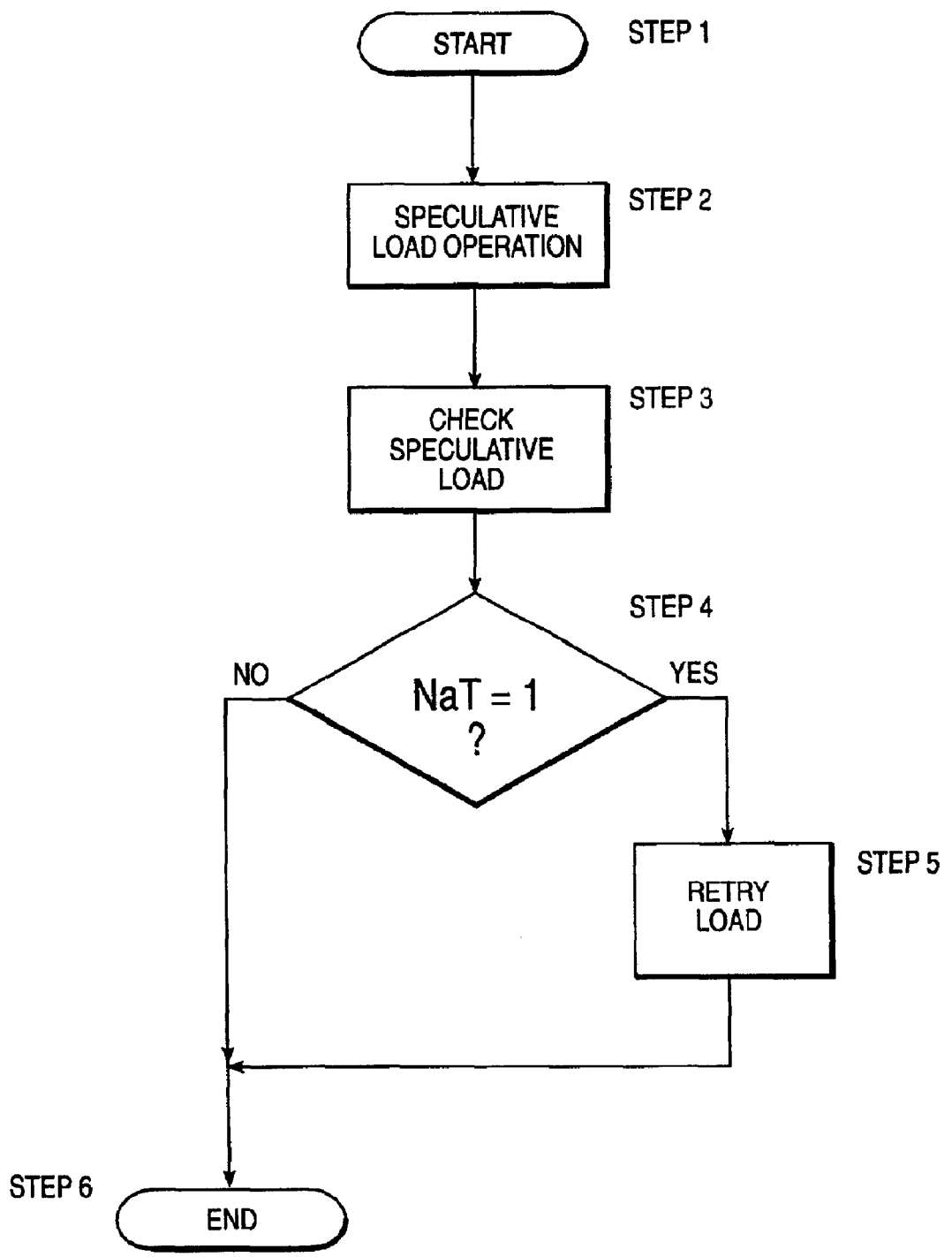
FIG. 7 is a flow chart illustrating the steps implemented by the present invention to check speculative load operations.

Referring to FIG. 7, a flow chart illustrating the steps implemented by a processor utilizing the present is shown. At step 1, the process is started and a speculative load instruction (ld.s) is executed at step 2. Then a load check instruction (ld8.cs) in accordance with the present invention is executed which determines the validity of the speculative load that previously accessed data from memory (step 3). At step 4, the check speculative load determines whether the NaT bit associated with the speculative load instruction is set. If not (NaT=0), then the invention proceeds to step 6 and ends. However, if the NaT bit is set equal to one, then the speculatively loaded data is not valid and the ld8.cs instruction causes the load to be retried at step 5. This is in contrast to the prior art speculative check (chk.s) instruction which causes an immediate branch instruction to call recovery routines to reload the data, taking a significant amount of processor cycle time. Further, the ld8.cs instruction is distinct from the existing advanced load check (ld.c) instruction in that only the NaT bit needs to be checked to determine whether the data is valid. More particularly, with the ld.c instruction there must be an entry in the ALAT which corresponds to the advanced load instruction. Thus, it can be seen that the present invention provides significant advantages in terms of resource optimization when compared to conventional techniques.

As another embodiment, the IA-64 architecture implements a speculative advanced load which can be used as shown below:

```
(1) ld8      r20 = [r19]        // get pointer
;;
(2) ld8.sa   r21 = [r20]        // speculatively read value which pointer
                                   points to,
                                // write an entry in the ALAT if successful,
                                   remove
                                // ALAT entry if unsuccessful
(3) cmp.eq p6,p0 = 0, r20       // was pointer null?
(4) (p6) br.cond NullPointer    // yes it was
;;
(5) ld8.c    r21 = [r20]        // proceed using advanced loaded value of
                                   r21, retry
                                // load if ALAT entry not found
```

In the technique shown immediately above, an advanced load performs the load operation and stores the load address and the destination register in the ALAT, with conflicting stores removing entries from the ALAT. If a load is found in the ALAT by the ld8.c instruction then the advanced load was successfully accomplished with no conflicts. However, the success of a load check (ld.c) instruction is determined by finding a matching register tag in the ALAT. If a speculative advanced load fails (e.g. invalid address) then no matching register tag will be found and it is ensured that there is no ALAT entry so the ld8.c will retry the load. This implementation has the disadvantage that the ALAT is typically very small (32×2 entries, indexed by physical register number) so that entries can be lost thereby causing unnecessary reloads to be done. That is, entries in the ALAT that represent a successful load may be processed out of the table, by some type of replacement algorithm, such that a reload must occur, even when the initial load was successful.

Other embodiments exist for checking the success of an advanced load, but may not exhibit all of the advantages of the preferred embodiment of the present invention.

An example of an additional embodiment of the present invention, which increases the efficiency of a speculative load operation is now provided.

```
(1) ld8      r20 = [r19]        // get pointer
;;
(2) ld8.s    r21 = [r20]        // speculatively read value which pointer
                                   points to
(3) cmp.eq p6,p0 = 0, r20       // was pointer null?
(4) (p6) br.cond NullPointer    // yes it was
;;
(5) tnat     p6 = r21           // test NaT bit
(6) (p6)     br.cond recover    // was speculation successful?
(7) continue:
(8) recover:
(9) ld8      r21 = [r20]        // retry the load
(10) br.cond continue           // continue
```

In this case the branch to recovery code should execute faster than some other techniques, it can be seen that this example uses more code to retrieve the recovery code.

A further example of another embodiment of the present invention to optimize speculative loads is set out below.

```
(1) ld8      r20 = [r19]        // get pointer
;;
(2) ld8.s    r21 = [r20]        // speculatively read value which pointer
                                   points to
```

-continued

| | |
|---|---|
| (3) cmp.eq p6,p0 = 0, r20 | // was pointer null? |
| (4) (p6) br.cond NullPointer | // yes it was |
| ;; | |
| (5) tnat.nz p6 = r21 | // test NaT bit |
| ;; | |
| (6) (p6) ld8 r21 = [20] | // use predication to conditionally execute this<br>// recovery instruction |
| (7) // use r21 | |

To increase efficiency this embodiment may use more program code steps and take additional cycles to execute, when compared to other preferred embodiments.

Another aspect of the present invention would include an instruction which is a speculative reload check instruction.

ld8.sc r21=[r20]

This program instruction would be used in the situation where a speculative reload instruction is being processed. In this case, if the NaT bit for r21 is clear (zero), then nothing is done and the data in r21 is available during the current cycle. However, if the NaT bit is set, the reload is retried speculatively. If the load again cannot be completed then the NaT bit for r21 will again be set rather than exception routines being called. This embodiment would be used if it seemed that the reason the original speculation failed (e.g. page not present) may no longer be present, but there may still be reasons why the load could not be completed.

Although certain preferred embodiments have been shown and described, it should be understood that many changes and modifications may be made therein without departing from the scope of the appended claims.

What is claimed is:

1. A method of operating a data processing system, having a microprocessor that executes program instructions, comprising the steps of:
   determining an order of said program instructions;
   moving load instruction from an original position in program order to an advanced position in said program order;
   speculatively executing said load instruction;
   checking status information associated with said load instruction to determine whether it executed successfully; and
   retrying said load instruction by speculatively re-executing said load instruction prior to said original position in program order when said load instruction does not execute successfully;
   wherein said retried load instruction does not call any recovery routines.

2. A method according to claim 1 wherein said certain program instruction is a load instruction for retrieving information from memory.

3. A method according to claim 2 wherein said step of checking status information comprises the step of determining whether the information retrieved by said load instruction is valid based on the state of a status bit.

4. A method according to claim 3 wherein said step of checking is implemented by a speculative load check program instruction.

5. A data processing system, having a microprocessor that executes program instructions, comprising:
   means for determining an order of said program instructions, and for moving a load instruction from an original position in program order to an advanced position in said program order;
   means for speculatively executing said load instruction;
   means for checking status information associated with said load instruction to determine whether it executed successfully; and
   means for retrying said load instruction by speculatively re-executing said load instruction prior to said original position in program order when said load instruction does not execute successfully;
   wherein said retried load instruction does not call recovery routines.

6. A system according to claim 5 wherein said certain program instruction is a load instruction for retrieving information from memory.

7. A system according to claim 6 wherein said means for checking comprises means for determining whether the information retrieved by the load instruction is valid, based on the state of a status bit.

8. A system according to claim 7 wherein said means for checking is implemented by a speculative load check program instruction.

9. A computer program product, including a plurality of program instructions which are executable by a microprocessor in a data processing system and stored on a computer readable medium, said computer program product, comprising:
   means for determining an order of said program instructions, and for moving a load instruction from an original position in program order to an advanced position in said program order;
   means for checking status information associated with said load instruction to determine whether it executed successfully;
   means for speculatively executing said load instruction; and
   means for retrying said load instruction by speculatively re-executing said load instruction prior to said original position in program order when said load instruction does not execute successfully;
   wherein said retried load instruction does not call any recovery routines.

10. A computer program product according to claim 9 wherein said certain program instruction is a load instruction for retrieving information from memory.

11. A computer program product according to claim 10 wherein said means for checking comprises means for determining whether the information retrieved by the load instruction is valid, based on the state of a status bit.

12. A computer program product according to claim 11 wherein said means for checking is implemented by a speculative load check program instruction.

13. A method of operating a data processing system, having a microprocessor that executes program instructions, comprising the steps of:
   determining an order of said program instructions;
   moving a load instruction, for retrieving information from memory, from an original position in program order to an advanced position in said program order;
   checking status information associated with said load instruction to determine if the information retrieved is valid, based on the state of a status bit;
   speculatively executing said load instruction; and
   retrying speculative execution of said speculatively executed load instruction prior to said original position in program order when its initial execution is unsuccessful;

wherein said retried speculative load instruction does not call any recovery routines.

14. A method according to claim 13 wherein said step of checking status information determines whether the information retrieved by said load instruction is valid based only on the state of a status bit.

15. A data processing system, having a microprocessor that executes program instructions including a load instruction which retrieves information from a storage location, comprising:

a compiler that determines an order of said program instructions, and is capable of moving said load instruction from an original position in said program order to an advanced position in said program order;

a status register that stores an indication of the validity of said load instruction;

a control unit that processes a check load instruction and determines the state of said status register;

an execution unit that speculatively executes said load instruction; and wherein speculative execution of said load instruction is retried prior to said original position in said program order based on the state of said status register; and wherein said retried speculative load instruction does not call any recovery routines.

16. A data processing system, comprising a memory;

a microprocessor that executes program instructions including a load instruction which retrieves information from said memory;

a compiler that determines an order of said program instructions, and is capable of moving said load instruction from an original position in said program order to an advanced position in said program order;

a status register that stores an indication of the validity of said load instruction;

a control unit that processes a check load instruction to determine the state of said status register;

an execution unit in said microprocessor that speculatively executes said load instruction; and wherein speculative execution of said load instruction is retried prior to said original position in said program order based on the state of said status register; and wherein said retried speculative load instruction does not call any recovery routines.

17. A system according to claim 16 wherein said status register is a single bit and said execution is retried when said bit is set.

18. A data processing system, comprising a memory;

a microprocessor that executes program instructions including a load instruction which retrieves information from said memory;

a compiler that determines an order of said program instructions, and is capable of advancing said load instruction from an original position in said program order to an advanced position in said program order;

a status register that stores an indication of the validity of said load instruction;

a control unit that processes a check load instruction to determine the state of said status register;

an execution unit in said microprocessor that speculatively executes said load instruction; and wherein speculative execution of said load instruction is retried prior to said original position in said program order based on the state of said status register and independent of other status information; and wherein said retried speculative load instruction does not call any recovery routines.

19. A data processing system, comprising a memory;

a microprocessor that executes program instructions including a load instruction which retrieves information from said memory;

a compiler that determines an order of said program instructions, and is capable of advancing said load instruction from an original position in said program order to an advanced position in said program order;

a load address table for storing an address of said load instruction to be speculatively executed by said microprocessor; and an execution unit in said microprocessor that speculatively executes said load instruction, and determines if said load instruction executed successfully by executing an instruction to check whether said address of said load instruction remains stored in said load address table;

wherein speculative execution of said load instruction is retried prior to said original position in said program order based on the presence of said address of the speculatively executed load instruction in said load address table; and wherein said retried speculative load instruction does not call any recovery routines.

* * * * *